United States Patent Office 3,267,082
Patented August 16, 1966

3,267,082
COPOLYMERS OF SPECIFIC HETEROCYCLIC COMPOUNDS
Peter L. de Benneville, Philadelphia, and Warren D. Niederhauwer, Meadowbrook, Pa., assignors to Rohm & Haas Company, Philadelphia, Pa., a corporation of Delaware
No Drawing. Filed May 24, 1962, Ser. No. 197,241
15 Claims. (Cl. 260—78.5)

This case deals with copolymers of specific heterocyclic compounds as new compositions of matter.

The specific heterocyclic compounds of this invention may be represented by the formula

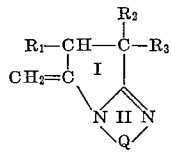

The symbol $R_1$ represents a hydrogen atom or an alkyl group of one to five carbon atoms. The symbols $R_2$ and $R_3$ may be hydrogen atoms or hydrocarbon groups containing from one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ when taken together with the carbon atoms to which they are joined may form a carbocyclic ring containing five to six carbon atoms which in turn may have alkyl substituents containing a total of no more than four additional carbon atoms. The total number of carbon atoms in ring I should not exceed 24. The preferred embodiments are those in which $R_1$ is a hydrogen atom, $R_2$ is a methyl group, and $R_3$ is an alkyl group. $R_2$ and $R_3$, may typically individually represent methyl, butyl, octyl, benzyl, phenylbutyl, cyclopentyl, cyclohexyl, phenyl, napthyl, butylphenyl groups and the like.

The symbol Q represents a chain of two to three carbon atoms between the two nitrogen atoms to which it is joined. Q may be a straight chain alkylene group, an alkyl-substituted alkylene group, or a cycloalkylene, arylene, or aralkylene group as long as there are no more than two to three carbon atoms between the two primary amino groups. While the upper limit of carbon atoms in Q is not especially critical, about 18 is considered the practical upper limit. Also, while the group Q may contain alkyl substituents there cannot be two alkyl substituents on either of the carbon atoms attached directly to the amino nitrogen atoms.

These heterocyclic compounds are prepared by reacting a ketonitrile having the formula

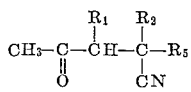

with a diprimary amine $NH_2QNH_2$, under conditions whereby ammonia and water are split out and removed. Usually this is done in the presence of an inert solvent that forms an azeotrope with water. Useful as solvent in this respect are benzene, toluene, xylene, heptane, hexane, methylene chloride, chloroform, and the like. If the particular $NH_2QNH_2$ employed is insoluble in water, a large excess of the amine may be employed, as a solvent. The water is removed azeotropically as the reaction progresses, preferably at about 40° to 250° C. Alternatively, if $NH_2QNH_2$ is high broiling, the solvent can be dispensed with, and the combination of reactants merely heated at temperatures of 80 to 150° C. while water and ammonia are withdrawn. The reaction is desirably terminated after the substantially theoretical amount of water is removed. The product may be isolated by distillation, under reduced pressure if necessary, or recrystallized from a solvent, such as isooctane, as desired. If the diprimary amino compound has been used in excess to permit it to serve also as a solvent, it has to be separated from the product by conventional methods, such as distillation.

The heterocyclic compounds employed in the copolymer of this invention are made by reacting $NH_2QNH_2$ with the previously defined ketonitrile such as
4 - oxopentanenitrile,
3 - methyl - 4 - oxopentanenitrile,
2 - butyl - 4 - oxopentanenitrile,
2,2 - dimethyl - 4 - oxopentanenitrile,
2 - methyl - 2 - ethyl - 4 - oxopentanenitrile,
2 - methyl - 2 - (2,2,4,4 - tetramethylpentyl) - 4 - oxopentanenitrile,
2 - methyl - 2 - neopentyl - 4 - oxopentanenitrile,
2 - phenyl - 4 - oxopentanenitrile,
2 - benzyl - 4 - oxopentanenitrile,
2 - cyclohexyl - 4 - oxopentanenitrile,
2 (4' - methylphenyl) - 4 - oxopentanenitrile,
2 - acetyl - 1 - methylcyclopentanecarbonitrile,
3,3 - dimethyl - 2 - (2 - oxopropyl) - bicyclo - 2,2,1-heptane - 2 - carbonitrile and 1 - (2 - oxopropyl) cyclohexane - carbonitrile.

Typical $NH_2QNH_2$ reactants are

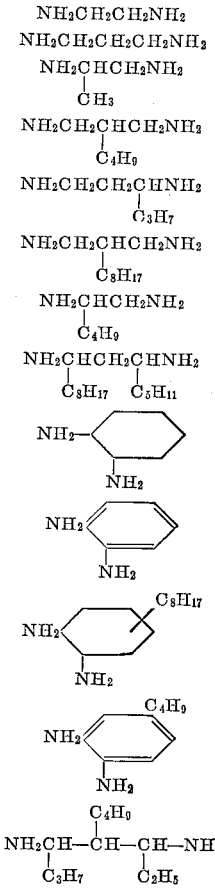

The heterocyclic compounds described hereinbefore may be copolymerized with ethylenically unsaturated free radically polymerizable monomers.

Suitable as comonomers are alkyl and aryl acrylates in which the alkyl or aryl portion contains preferably one to eighteen carbon atoms; alkyl and aryl methacrylates in which the alkyl or aryl portion contains preferably one to eighteen carbon atoms; vinylidene cyanide; acrylonitrile; methacrylonitrile; alkylaminoalkyl and dialkylaminoalkyl acrylates and methacrylates; acrylamide and methacrylamide, and their N-alkyl substituted derivatives; styrene and alkyl ring substituted styrenes containing no more than a total of about 20 carbon atoms; α-methylstyrene; divinylbenzene and alkyl-substituted divinylbenzenes; trivinylbenzene and alkyl-substituted trivinylbenzenes; vinyl esters, in which the carboxylate portion contains one to eighteen carbon atoms, including the carbon of the carboxylate functions; vinyl alkyl ethers and vinyl alkyl sulfides in which the alkyl portion contains no more than 18 carbon atoms and N-vinyl lactams preferably containing from 6 to 20 carbon atoms; alkyl vinyl sulfones in which the alkyl portion contains up to about 18 carbon atoms; N-vinyl-alkyleneureas containing from 5 to 12 carbon atoms; olefins such as isobutylene; butadiene and isoprene; dialkyl fumarates of up to 24 carbon atoms; dialkyl maleates of up to 24 carbon atoms; and dialkyl itaconates of up to 24 carbon atoms; and vinylpyridines. In the above monomers, the alkyl groups may exhibit any possible spatial configurations such as normal, iso, or tertiary. These alkyl groups may be acyclic or cyclic, including alkyl substituted cyclic, as long as the total carbon content conforms to the defined amount. In the ring substituted styrenes the substituents may occupy any possible ring location or locations and when the substituents are alkyl groups, they may have any possible spatial configuration.

Typical of the above monomers that may be employed are methyl acrylate,
isopropyl acrylate,
cyclopentyl acrylate,
2-ethylhexyl acrylate,
decyl acrylate,
dodecyl acrylate,
octadecyl acrylate,
methyl methacrylate,
t-butyl methacrylate,
cyclohexyl methacrylate,
octyl methacrylate,
undecyl methacrylate,
phenyl methacrylate,
vinyl methacrylate,
dimethylaminoethyl methacrylate,
methoxyethyoxyethyl methacrylate,
t-butylaminoethyl methacrylate,
t-dodecylaminoethyl acrylate,
octadecyl methacrylate,
acrylonitrile,
methacrylonitrile,
vinylidene cyanide,
N,N-dibutyl acrylamide,
acrylamide,
N-methylacrylamide,
N-t-octylacrylamide,
styrene,
p-butylstyrene,
p-octylstyrene,
o-chlorostyrene,
o,p-dipropylstyrene,
p-cyanostyrene,
o-methyl-p-decylstyrene,
1,4-divinylbenzene,
sym.-trivinylbenzene,
formamidoethyl vinyl ether,
butanamidodecyl vinyl ether,
acetamidooctadecyl vinyl ether,
ureidoethyl vinyl ether,
butyl vinyl sulfide,
octyl vinyl sulfide,
octadecyl vinyl sulfide,
dimethylaminoethyl vinyl sulfide,
diethylaminodecyl vinyl sulfide,
morpholinopentyl vinyl sulfide,
pyrrolidinyloctyl vinyl sulfide,
piperidinodecyl vinyl sulfide,
N-vinyl-2-pyrrolidinone,
N-vinyl-5-methyl-2-pyrrolidinone,
N-vinyl-4,4-diethyl-2-pyrrolidinone,
N-vinyl-4-butyl-5-octyl-2-pyrrolidinone,
N-vinyl-6-methyl-2-piperidone,
N-vinyl-6-octyl-2-piperidone,
N-vinyl-2,2,6,6-tetramethyl-4-piperidone,
N-vinyl-2-oxohexamethylenimine,
N-vinyl-5,5-dimethyl-2-oxohexamethylenimine,
N-vinyl-4-butyl-5-octyl-2-oxohexamethylenimine,
methyl vinyl sulfone,
isobutyl vinyl sulfone,
t-octyl vinyl sulfone,
dodecyl vinyl sulfone,
octadecyl vinyl sulfone,
divinyl sulfone,
N-vinylethyleneurea,
N-vinyltrimethyleneurea,
N-vinyl-1,2-propyleneurea,
N-vinylbutyleneurea,
N-vinyl-N'-dibutylaminododecylethyleneurea,
butadiene,
isoprene,
N-vinylcarbozole,
vinyl acetate,
vinyl stearate,
dimethyl maleate,
dioctyl maleate,
dimethyl itaconate,
dibutyl itaconate,
dihexyl itaconate,
dimethyl fumarate,
diethyl fumarate,
dioctyl fumarate,
dibutyl fumarate,
didodecyl fumarate,
dibutyl maleate,
dihexyl maleate,
didecyl maleate,
diethyl itaconate,
dioctyl itaconate,
didodecyl itaconate,
and 2-vinyl-5-methylpyridine.

It is understood that, in many cases, it will be preferred to combine more than one of the above comonomers with the heterocyclic monomer, as for example, methyl methacrylate and styrene, in order to achieve various modifications and properties of the product contemplated.

The heterocyclic monomers used with the above comonomers in this invention are combined in the ratio of one molecular equivalent for each vinyl group of the other monomer or monomers, or less. Higher ratios of the heterocyclic monomer may be used, but it has been found that in these cases, the excess over one molecular equivalent is recovered as unreacted monomer.

Polymerization may be carried out in bulk when the monomers are liquids or low-melting solids, in solution, or in either suspension or emulsion. In bulk and solution polymerization, the reaction may be carried out without catalyst, initiated with light and heat, but it is preferred to use one or more of the peroxide or azo initiators which act as free radical catalysts, and are effective between 30° C. and 150° C. These may be employed in amounts of 0.01 to 10% or more by weight, preferably 0.01 to 1% by weight. Typical initiators include benzoyl peroxide, t-butyl peroxide, acetyl peroxide, capryl peroxide, t-butyl hydroperoxide, cumene hydroperoxide, t-butyl perbenzoate, methylethyl ketone peroxide, azodiisobutyronitrile, azodiisobutyramide, dimethyl, diethyl, or dibutyl azodiisobutyrate, azobis(α,γ-dimethylvaleronitrile), azobis(α-methylbutyronitrile), azobis(α-methylvaleronitrile), dimethyl or diethyl azobis-α-methylvalerate, and the like.

Solution polymerization may be carried out in water, benzene, toluene, xylene, solvent naphthas, dioxane, diisobutyl ketone, acetonitrile, dimethyl formamide, tert-butyl alcohol and the like, depending on the solubilities of the monomers it is desired to use.

Emulsion polymerization is particularly effective with those members of the heterocyclic series which have low solubilities in water. There may be used in forming the emulsion non-ionic or cationic emulsifiers such as dodecyldimethylbenzylammonium chloride,
dodecylbenzyltrimethylammonium chloride,
cetylpyridinium chloride,
alkylphenoxypolyethoxyethanols having alkyl groups of about 7 to 18 carbon atoms and 6 to 60 or more oxyethylene units, such as heptylphenoxypolyethoxyethanols,
octylphenoxypolyethoxyethanols,
methyloctylphenoxypolyethoxyethanols,
nonylphenoxypolyethoxyethanols,
dodecylphenoxypolyethoxyethanols, and the like; polyethoxyethanol derivatives of methylene-linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of 6 to 15 carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monosterate containing 6 to 60 oxyethylene units, etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremely effective. This includes the use of an organic peroxide, such as benzoyl peroxide, acetyl peroxide, capryl peroxide, and the like, or an inorganic peroxide, such as hydrogen peroxide, ammonium persulfate, sodium persulfate, potassium persulfate, or the like. The peroxidic catalyst is effectively coupled with a reducing agent, such as a sulfite, bisulfite, metasulfite, or hydrosulfite of ammonium, sodium potassium or the like.

Polymerization may also be initiated by high-energy irradiation. Suitable sources of high energy-irradiation are radioactive materials and electron accelerators. Useful as radioactive materials that supply gamma rays are irradiated isotopes such as $Co^{60}$, fission products such as $Cs^{137}$, adjuncts to fission reactants such as radioactive xenon, and the like. A $Co^{60}$ source is particularly effective. Useful as radioactive materials that supply beta rays are $Sr^{90}$ and the like. Valuable as electron accelerators, which supply beta rays, are the Van de Graaff generator, the resonant transformer, and the like. Dosages in the range of 10,000 to 10,000,000 REP's, preferably 500,000 to 2,000,000 REP's, are employed. A REP is equivalent to the ionization produced by the absorption of 93 ergs of energy per gram of irradiated substance. REP stands for roentgen-equivalent-physical and is a unit of intensity and time.

Preferred monomers include methyl methacrylate, acrylonitrile, ethyl acrylate, acrylamide, diethyl fumarate, diisobutyl fumarate, diethyl maleate, styrene and divinylbenzene.

Preferred embodiments of the heterocyclic compounds employed include those in which $R_1$, $R_2$ and $R_3$ are hydrogen or methyl and in which Q is an ethylene, trimethylene or 1,2-propylene group.

The various copolymers of the present invention may be more fully understood from the following examples which are offered by way of illustration and not by way of limitation. Parts by weight are used throughout.

EXAMPLE 1

There is prepared a solution consisting of 5 parts of methyl methacrylate, 5 parts of 7,7-dimethyl-5-methylene-2,3,5,6-tetrahydro-[7H]-pyrrolo(1,2-a)-imidazole, and 0.01 part azodiisobutyronitrile. This solution is heated under nitrogen at 70° C. for 24 hours to yield a clear, hard colorless polymer. The polymer dissolves in chloroform, acetone and dilute hydrochloric acid.

A 10% solution of the exactly HCl-neutralized polymer is an effective thickening agent for starch-water mixtures which are to be applied to paper or cloth. The polymer itself can be extrusion-molded, or can be cast in any desired form.

A solution prepared from 4 parts of methyl methacrylate, 16 parts of 7,7-dimethyl-5-methylene-2,3,5,6-tetrahydro-[7H]-pyrrolo(1,2-a)-imidazole and 0.1 part of azodiisobutyronitrile is polymerized in the same manner. The viscous product is dissolved in 64 parts of acetone and slowly dripped into 1650 parts of hexane with stirring to yield a white powder, which after drying at room temperature and 0.1 mm. of Hg pressure amounted to 7.5 parts of polymer. The neutralization equivalent of this material is found to be 377 by dissolving the polymer in dilute hydrochloric acid and back titrating the excess acid with dilute NaOH. Elemental analysis obtained on the polymer indicates that one mole of 7,7-dimethyl - 5 - methylene - 2,3,5,6 - tetrahydro-[7H]-pyrrolo(1,2-a)-imidazole is combined with 2 moles of methyl methacrylate in this polymer. A similar polymer is obtained when 0.1% benzoyl peroxide is used as initiator. In a similar manner, 3,6-dimethyl-5-methylene-2,3,5,6-tetrahydro-[7H]-pyrrolo(1,2-a)imidazole having the structure:

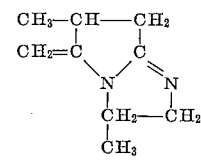

and methyl methacrylate in equivalent amounts give a white powder of similar nature and utility.

EXAMPLE 2

Solutions of methyl methacrylate, 7,7-dimethyl-5-methylene - 2,3,5,6 - tetrahydro - [7H] - pyrrolo(1,2 - a) - imidazole and azodiisobutyronitrile are prepared and degassed by the freeze-thaw method. Polymerizations are run at 60° C., but interrupted at low conversions. Polymers are purified by precipitation from an acetone solution with hexane and are dried at 50° C. in vacuo for 20 hours. The components are given in the following table as parts by weight:

| | Example 1 | Example 2 | Example 3 | Example 4 |
|---|---|---|---|---|
| Component A [1] | 6.9501 | 5.4869 | 4.2403 | 3.6436 |
| Component B [2] | 1.9873 | 3.7194 | 5.4894 | 7.4116 |
| Component C [3] | 0.0022 | 0.0019 | 0.0021 | 0.0022 |
| Polymerization Period (hrs.) | 3.4 | 3.4 | 3.1 | 4.3 |
| Conversion, percent | 2.9 | 7.2 | 7.9 | 16.9 |
| Percent Nitrogen in copolymer | 8.54 | 8.13 | 6.42 | 5.63 |
| Percent 7,7-dimethyl-5-methylene-2,3,5,6-tetrahydro-7H-pyrrolo (1,2-a)-imidazole | 45.8 | 43.6 | 34.4 | 30.2 |

[1] A = 7,7-dimethyl-5-methylene-2,3-5,6-tetrahydro-7H-pyrrolo (1,2-a)-imidazole.
[2] B = methyl methacrylate.
[3] C = azodiisobutyronitrile.

EXAMPLE 3

A solution consisting of 36 parts of 7,7-dimethyl-5-methylene - 2,3,5,6 - tetrahydro - [7H] - pyrrolo(1,2-a)imidazole, 4 parts of acrylonitrile and 0.04 parts of azoisobutyronitrile is heated under nitrogen at 70° for 24 hours. The final product is dissolved in 37 parts of chloroform and dripped into 325 parts of stirred hexane. The solid is filtered off, washed with hexane and dried at 56°/0.1 mm. of Hg pressure to yield 1.34 parts of a white solid. This solid absorbs moisture and carbon dioxide from the atmosphere. When it is dried to constant weight it loses 8.7% of its weight, and regains 6.4% in 10 minutes upon exposure to air.

The purified product is found to have a neutral equivalent of about 215 when dissolved in dilute hydrochloric acid and back titrated with a dilute NaOH solution. Elemental analyses on the dried material indicates the polymer to consist of 0.437 mole of acrylonitrile, 0.436 mole of 7,7 - dimethyl-5-methylene-2,3,5,6-tetrahydro-[7H]-pyrrolo(1,2-a)imidazole and 0.3 mole of water. With this composition the expected equivalent weight would be 210. The dried polymer is a useful organic desiccant.

Copolymers of acrylonitrile and 7,7-dimethyl-5-methylene-2,3,5,6-tetrahydro - [7H] - pyrrolo(1,2-a)imidazole containing up to 10% 7,7-dimethyl-5-methylene-2,3,5,6-tetrahydro-[7H]-pyrrolo(1,2-a)imidazole, and if desired minor percentages of a third component, such as styrene, methyl methacrylate or ethyl acrylate, can be dissolved in a suitable solvent, such as dimethylformamide, and spun into fibers in the customary manner. A fiber prepared in this way from 90% acrylonitrile and 10% 7,7-dimethyl-5-methylene-2,3,5,6-tetrahydro - [7H]-pyrrolo(1,2-a)imidazole shows excellent adsorption for acid dyes, and better moisture regain properties than in the case of an equivalent fiber which does not contain 7,7-dimethyl-5-methylene-2,3,5,6-tetrahydro-[7H]-pyrrolo(1,2-a)imidazole.

When two parts of acrylonitrile and 18 parts of 7,7-dimethyl-5-methylene-2,3,5,6-tetrahydro - [7H]-pyrrolo (1,2-a) imidazole are heated as above, but without initiator, there is obtained 8.6 parts of solid polymer after precipitation from an acetone solution using n-hexane. This product has an equivalent weight of 228.

EXAMPLE 4

A solution of 8.9192 parts of acrylonitrile, 9.0238 parts of 7,7 - dimethyl-5-methylene - 2,3,5,6-tetrahydro-[7H]-pyrrolo(1,2-a)imidazole, 0.0045 part of azodiisobutyronitrile and 21.3380 parts of dimethyl formamide is degassed by the freeze-thaw method and heated at 60° for a period of 1.5 hours. The conversion is 12.2%. The reaction mixture is dissolved in acetone and the copolymer is precipitated by addition of this solution in n-hexane. The resulting copolymer is found to be an alternating copolymer based on nitrogen analysis and infra-red spectrum.

EXAMPLE 5

A solution of 3 parts of methyl acrylate, 3 parts of 5 - methylene-2,3,5,6-tetrahydro - [7H] - pyrrolo(1,2-a) imidazole and 0.006 part of azodiisobutyronitrile is heated in a nitrogen atmosphere for 24 hours at 80°. Within one hour the material appears to be solid. This hard polymer is dissolved in 71 parts of acetone and slowly added to 460 parts of n-hexane. The purified material is washed with hexane. It is gum-like and is dissolved in acetone. Upon evaporation there is obtained 3 parts of solid. A nitrogen analysis indicates the co-polymer to contain 39.5% 5-methylene-2,3,5,6-tetrahydro-[7H]-pyrrolo(1,2-a)imidazole. A titration with N/10 perchloric acid in acetic acid using CHCl₃ as solvent for the sample gives an equivalent weight corresponding to 41.2% 5-methylene-2,3,5,6-tetrahydro-[7H] imidazo (1,2-a) pyrrile in the copolymer. The copolymer is soluble in dilute hydrochloric acid. Substitution of benzoyl peroxide for azodiisobutyronitrile gives a hard clear polymer.

EXAMPLE 6

A mixture of 2 parts of dimethyl fumarate, 18 parts of 7,7-dimethyl-5-methylene-2,3,5,6-tetrahydro-[7H]-pyrrolo(1,2-a)imidazole and 0.002 part of azoisobutyronitrile were heated under nitrogen at 70° C. In about two minutes solution resulted. At the end of the 24 hour heating period the material is a thick, yellow oil. The excess 7,7-dimethyl-5-methylene-2,3,5,6-tetrahydro-[7H]-pyrrolo(1,2-a)imidazole is stripped out to yield a copolymer composition which contains substantially one mole of 7,7 - dimethyl-5-methylene-2,3,5,6-tetrahydro-7H-pyrrolo(1,2-a)imidazole per mole of dimethyl fumarate. The viscous polymer is dissolved in an equivalent amount of 5% HCl to yield a useful thickening agent.

EXAMPLE 7

A solution of 1 part of diethyl fumarate, 1 part of 7,7-dimethyl-5-methylene-2,3,5,6-tetrahydro - [7H] - pyrrolo (1,2-a)imidazole and 0.002 part of azoisobutyronitrile under nitrogen is heated at 70° C. for 24 hours. At the end of one hour there is no flow. At the end of 24 hours the polymer is easily broken into soft fragments. It is dissolved in 12 parts of acetone and dropped into 165 parts of n-hexane. The material coagulates to a soft rubbery solid but upon scraping it in the container with another 16 parts of n-hexane the material becomes a light yellow powder. After drying at 25° C./0.1 mm. the yield is 1.75 parts. The final product is soluble in N/10 HCl. A solution in CHCl₃ upon evaporation gives a clear film. A titration of the product is performed by dissolving the sample in excess N/10 HCl and back titrating with N/10 NaOH. An equivalent weight of 422 is obtained. This corresponds to 1 mole of 7,7-dimethyl-5-methylene-2,3,5,6 - tetrahydro - [7H] - pyrrolo(1,2-a) imidazole and 1.26 of the di-ester.

A repeat experiment without the azoisobutyronitrile gives a product in 5 hours which is barely pourable. The product after 24 hours is hard and clear. The final product amounts to 1.58 parts and has an equivalent weight of 415. The product in the form of its hydrochloride is an excellent rust preventive.

EXAMPLE 8

A solution consisting of 1 part of di-isobutyl fumarate, 1 part of 7,7-dimethyl-5-methylene-2,3,5,6-tetrahydro-[7H]-pyrrolo(1,2-a)imidazole and 0.002 part of azoisobutyronitrile is heated for 24 hours under nitrogen at 70° C. The mixture upon cooling to room temperature barely flows. The mixture is soluble in heating oils and small percentages (1% or less) prevent the deposition of sludge.

EXAMPLE 9

A solution of 4 parts of diethyl maleate, 4 parts of 7,7 - dimethyl - 5 - methylene - 2,3,5,6 - tetrahydro-[7H]-pyrrolo(1,2-a)imidazole and 0.008 part of azoisobutyronitrile is heated at 70° under nitrogen for 24 hours. This material, upon cooling to room temperature, does not flow. It is a clear yellow color as is the starting solution.

In a similar manner, 7-methyl-7-sec-nonyl-5-methylene-2,3,5,6-tetrahydro-[7H]-pyrrolo(1,2-a)imidazole and di-octyl fumarate give a viscous oil. This oil is soluble in gasoline, which it stabilizes from gum formation. It also serves to protect metal surfaces in contact with the gasoline.

EXAMPLE 10

A solution consisting of 3 parts of 7,7-dimethyl-5-methylene-2,3,5,6-tetrahydro-[7H]-pyrrolo(1,2-a)imidazole, 3 parts of styrene and 0.006 part of azoisobutyronitrile is heated at 80° for 24 hours in a nitrogen atmosphere. At the end of this time a thick oil is obtained which is dissolved in 40 parts of acetone. The polymer is precipitated by slowly adding this solution to 330 parts of n-hexane. The solid is taken up in 15 parts of $CHCl_3$ and the solution is evaporated in a rotary evaporator to yield 1.65 parts of a white solid. This material is titrated with $N/10$ $HClO_4$ in acetic acid and is shown to have an equivalent weight of 1365 which corresponds to 11% 7,7 - dimethyl - 5 - methylene - 2,3,5,6 - tetrahydro-[7H]-pyrrolo(1,2-a)imidazole in the polymer.

In the same manner, from 5-methylene-3-octyl-7-phenyl-2,3,5,6-tetrahydro-[7H]-pyrrolo(1,2-a)imidazole and 4-ethyl styrene, there is obtained a thick oil which is useful in imparting gloss to leather articles.

EXAMPLE 11

The reaction of Example 10 is repeated with the addition of 1 part of divinylbenzene. The mixture coagulates on heating into a hard cross-linked polymer, insoluble in all solvents and in hydrochloric acid solution. This polymer has useful ion-exchange properties.

EXAMPLE 12

A mixture is made of 3 parts of vinyl acetate, 1 part of diethyl fumarate, 0.1 part of 7,7-dimethyl-5-methylene-2,3,5,6 - tetrahydro - [7H] - pyrrolo(1,2-a)imidazole and 0.01 part of azodiisobutyronitrile in 20 parts of ethoxyethyl acetate. The mixture is heated for 24 hours at 80° C. The resulting solution becomes thick, and when it is brushed or sprayed on surfaces, provides a transparent, tough, adhesive coating, especially to metal surfaces.

EXAMPLE 13

A solution is made of 18 parts of vinylidene cyanide and 1 part of 7,7-dimethyl-5-methylene-2,3,5,6-tetrahydro-[7H]-pyrrolo(1,2-a)imidazole in 120 parts of benzene, and cooled to about 0° C. There is then added 39 parts of isobutylene, followed 0.05 part of o,o'-dichlorobenzoyl peroxide. The vessel is sealed under nitrogen, and heated at 45° C. for 24 hours. The copolymer is filtered off. Fibers obtained from this polymer by conventional techniques show good dyeability by acid dyes.

EXAMPLE 14

A mixture is made of 12 parts of 7,7-dimethyl-5-methylene - 2,3,5,6 - tetrahydro - [7H] - pyrrolo(1,2-a)imidazole, 218 parts of acrylamide and 0.0034 part of benzoyl peroxide. The mixture is heated at 60° C. for 24 hours. The product is filtered off and washed with warm ethylene dichloride. It is dried at 80° C. and 1 mm. to yield 3.2 parts of a white, solid copolymer, which has a neutral equivalent of about 292. The copolymer dissolves in water to give, at 20% solids, a clear solution with Gardner-Holt viscosity of X to Y at 24°. This polymer is a useful aggregant for soils and flocculating agent.

EXAMPLE 15

A mixture is made of 15 parts of cetyl methacrylate, 3.0 parts of 7,7-dimethyl-5-methylene-2,3,5,6-tetrahydro-[7H]-pyrrolo(1,2-a)imidazole and 5 parts of hexyl acrylate. There is added 0.01 part of azodiisobutyronitrile, and the mixture is heated for 12 hours at 80°. The viscous oil which results is soluble in heating and lubricating oils, acting to disperse harmful sludges.

EXAMPLE 16

In 100 parts of toluene is dissolved 50 parts of sec-butyl methacrylate, one part of 2-N-tert. butylaminoethyl methacrylate, one part of 7,7-dimethyl-5-methylene-2,3,5,6-tetrahydro - [7H] - pyrrolo(1,2-a)imidazole and 0.01 part of azodiisobutyronitrile. The mixture is heated for 16 hrs. at 70° C. There is obtained a viscous solution of the terpolymer, which, when applied to wood or metal surfaces by brushing or spraying, gives a clear, hard adhesive film.

50 parts of sec. butyl methacrylate, and two parts of the hexahydropyrrolopyrimidine of the structure:

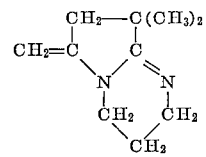

with 0.01 part of azodiisobutyronitrile give a similarly effective coating material.

EXAMPLE 17

A mixture is made of 100 parts of toluene, 20 parts of vinyl stearate, one part of diethyl fumarate, one part of N-vinylpyrrolidinone and one part of 7,7-dimethyl-5-methylene - 2,3,5,6 - tetrahydro - [7H] - pyrrolo(1,2-a) imidazole. There is added 0.1 parts of azodiisobutyronitrile, and the mixture heated 10 hours at 70° C. The resulting solution of terpolymer is an effective detergent-dispersant for light lube oils.

EXAMPLE 18

One part of N-(2-vinoxyethyl)urea is dissolved in 8 parts of 7,7-dimethyl-5-methylene - 2,3,5,6 - tetrahydro-[7H]-pyrrolo(1,2-a)imidazole and 0.2 part of ethyl azodiisobutyrate is added. The mixture is heated 24 hours at 70° C. The precipitated polymer is washed with ethylene dichloride. In combination with formaldehyde, aqueous solution of this copolymer are useful for imparting wet strength to paper.

EXAMPLE 19

A mixture is made of 14.2 parts of acrylamide, 30 parts of 7,7-dimethyl - 5 - methylene - 2,3,5,6 - tetrahydro-[7H]-pyrrolo(1,2-a)imidazole, 44 parts of water and 0.09 part of azodiisobutyronitrile. The container is flushed with nitrogen and stoppered, and shaken at 90° C. for 78 minutes. The material is a thick syrup at room temperature. Actone is added until the mixture solidified and the solid is washed with fresh acetone. It is filtered off, washed with hot ethyl acetate and dried, to yield 31 parts of a polymer, which is soluble in ethanol acid water. Aqueous solutions of this polymer are useful coagulants for turbid waters.

EXAMPLE 20

A mixture is made of 15 parts of methyl methacrylate and 2 parts of 5-methylene - 7,7 - pentamethylene - 2,3,5,6-tetrahydro - [7H] - pyrrolo - (1,2-a)imidazole, and to it is added 0.01 part of dimethyl azodiisobutyrate. The mixture is heated at 60° for 24 hours in a nitrogen atmosphere. The polymer is taken up in toluene and reprecipitated by addition to hexane. It is a colorless solid which can be molded into clear plastic forms.

In a similar fashion, methyl methacrylate and 5-methylene-6,7-tetramethylene-2,3,5,6-tetrahydro - [7H]-pyrrolo - (1,2-a)imidazole in similar proportion give a clear, hard, colorless polymer.

EXAMPLE 21

A mixture is made of 20 parts of methyl acrylate and 1 part of 2,3-tetramethylene-5-methylene - 2,3,5,6 - tetrahydro - [7H] - pyrrolo - (1,2-a)imidazole, and to it is added 0.1 part of benzoyl peroxide. The mixture is heated for 24 hours in a nitrogen atmosphere at 80°. A clear solid plastic results.

In a similar fashion, 5-methylene-5,6-dihydro - [7H]-pyrrolo(1,2-a)-2,3-benzimidazole, having the structure:

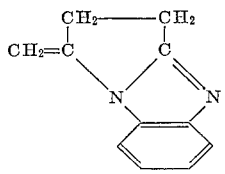

is copolymerized with methyl acrylate in the same manner, to give a clear solid polymer.

The copolymers of the present invention are useful as thickening agents for starch-water mixtures which are to be applied to paper or cloth. They are useful as additives for gasoline in which they are effective stabilizers in preventing gum formation and also exhibit valuable anti-rust activity. The present copolymers are useful as oil additives, particularly as pour point depressants, viscosity improvers, and anti-rust, anti-wear, and sludge dispersant agents. Many of the present copolymers are useful in the preparation of fibers which exhibit excellent acid dye adsorption. The copolymers of the present invention may also be used in coating formulations to provide tough transparent adhesive coatings especially to metal surfaces. These copolymers are also effective as aggregants for soils and glossing agents for leather. The copolymers may also be extruded, molded, or cast in any desired form to provide architectural signs, ornaments and structures.

It is preferred to employ the specific heterocyclic nitrogenous monomers of the present invention with an alkyl ($C_1$–$C_{18}$) methacrylate, alkyl ($C_1$–$C_{18}$) acrylate, acrylamide, acrylonitrile, dialkyl ($C_1$–$C_{12}$) fumarate, dialkyl ($C_1$–$C_{12}$) maleate, styrene or divinylbenzene. While in most instance the copolymers of the present invention are prepared from a specific heterocyclic compound with one of the other listed monomers it is quite satisfactory for many uses to employ additional monomers as desired in order to arrive at desired properties in the final product. One or more of the specific heterocyclic monomers may be used with one or more of the other stated monomers to form the valuable copolymers of this invention. The preferred heterocyclic nitrogenous monomers are those in which Q is ethylene, $R_1$ is hydrogen, $R_2$ is methyl and $R_3$ is alkyl of 1 to 10 carbon atoms.

The copolymers of the present invention may be prepared in a wide range of percentages of molecular units. The valuable properties described hereinbefore are observed when as little as 0.5% by weight of the heterocyclic nitrogenous monomer is employed. Also it is generally preferable to use about 2% or more of this monomer. As an upper limit there may be employed 50 mol percent of the heterocyclic nitrogenous monomer since said monomer does not homopolymerize.

We claim:
1. A copolymer of
(A) at least one monomer of the formula

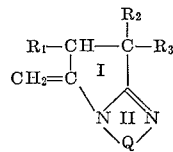

in which $R_1$ is a member selected from the class consisting of hydrogen and alkyl of one to five carbon atoms,
$R_2$ and $R_3$ taken individually are members selected from the class consisting of hydrogen and hydrocarbon groups of 1 to 10 carbon atoms selected from the class consisting of alkyl, aralkyl, cycloalkyl, aryl and alkaryl groups,
$R_1$ and $R_2$ taken collectively with the carbon atoms to which they are joined form a carbocyclic ring of 5 to 6 carbon atoms including alkyl substituents of a total of no more than 4 additional carbon atoms,
$R_2$ and $R_3$ taken collectively with the carbon atoms to which they are joined form a carbocyclic ring of 5 to 6 carbon atoms including alkyl substituents of a total of no more than 4 additional carbon atoms,
Q is a hydrocarbon group of 2 to 18 carbon atoms in which there are two to three carbons atoms between the two nitrogen atoms to which Q is attached and ring I contains up to 24 carbon atoms and
(B) at least one ethylenically unsaturated free radically polymerizable monomer.

2. A copolymer according to claim 1 in which
$R_1$ is hydrogen,
$R_2$ is methyl,
$R_3$ is alkyl of 1 to 10 carbon atoms, and
Q is an ethylene radical and said monomer of (B) is an alkyl ($C_1$–$C_{18}$) methacrylate.

3. A copolymer according to claim 1 in which
$R_1$ is hydrogen,
$R_2$ is methyl,
$R_3$ is alkyl of 1 to 10 carbon atoms, and
Q is an ethylene radical and said monomer of (B) is an alkyl ($C_1$–$C_{18}$) acrylate.

4. A copolymer according to claim 1 in which
$R_1$ is hydrogen,
$R_2$ is methyl,
$R_3$ is alkyl of 1 to 10 carbon atoms, and
Q is an ethylene radical and said monomer of (B) is acrylonitrile.

5. A copolymer according to claim 1 in which
$R_1$ is hydrogen,
$R_2$ is methyl,
$R_3$ is alkyl of 1 to 10 carbon atoms, and
Q is an ethylene radical and said monomer of (B) is acrylamide.

6. A copolymer according to claim 1 in which
$R_1$ is hydrogen,
$R_2$ is methyl,
$R_3$ is alkyl of 1 to 10 carbon atoms, and
Q is an ethylene radical and said monomer of (B) is an alkyl ($C_1$–$C_{12}$) fumarate.

7. A copolymer according to claim 1 in which
$R_1$ is hydrogen,
$R_2$ is methyl,
$R_3$ is alkyl of 1 to 10 carbon atoms, and
Q is an ethylene radical and said monomer of (B) is an alkyl ($C_1$–$C_{12}$) maleate.

8. A copolymer according to claim 1 in which
$R_1$ is hydrogen,
$R_2$ is methyl,
$R_3$ is alkyl of 1 to 10 carbon atoms, and
Q is an ethylene radical and said monomer of (B) is styrene.

9. A copolymer according to claim 1 in which
$R_1$ is hydrogen,
$R_2$ is methyl,
$R_3$ is alkyl of 1 to 18 carbon atoms, and
Q is an ethylene radical and said monomer of (B) is divinylbenzene.

10. A copolymer of 7,7-dimethyl-5-methylene-2,3,5,6-tetrahydro - [7H] - pyrrolo(1,2-a)imidazole and methyl methacrylate.

11. A copolymer of 7,7-dimethyl-5-methylene-2,3,5,6-tetrahydro-[7H]-pyrrolo(1,2-a)imidazole and ethyl acrylate.

12. A copolymer of 7,7-dimethyl-5-methylene-2,3,5,6-tetrahydro-[7H]-pyrrolo(1,2-a)imidazole and acrylonitrile.

13. A copolymer of 7,7-dimethyl-5-methylene-2,3,5,6-tetrahydro-[7H]-pyrrolo(1,2-a)imidazole and diisobutyl fumarate.

14. A copolymer of 7,7-dimethyl-5-methylene-2,3,5,6-tetrahydro-[7H]-pyrrolo(1,2-a)imidazole and dimethyl maleate.

15. A copolymer of 7,7-dimethyl-5-methylene-2,3,5,6-tetrahydro-[7H]-pyrrolo(1,2-a)imidazole and acrylamide.

References Cited by the Examiner

UNITED STATES PATENTS

| | | | |
|---|---|---|---|
| 2,993,046 | 7/1961 | Bortnick et al. | 260—309.6 |
| 2,993,049 | 7/1961 | Bortnick et al. | 260—88.3 |

JOSEPH L. SCHOFER, *Primary Examiner.*

DONALD E. CZAJA, LEON J. BERCOVITZ, L. WOLF, *Examiners.*